(12) United States Patent
Lee (10) Patent No.: US 7,174,165 B2
(45) Date of Patent: Feb. 6, 2007

(54) INTEGRATED WIRELESS LOCAL LOOP (WLL) AND WIRELESS LOCAL AREA NETWORK (WLAN) TRANSCEIVER APPARATUS

(75) Inventor: Joo Yeol Lee, Kyungki-Do (KR)

(73) Assignee: LG-Nortel Co., Ltd., Seoul (KR)

( * ) Notice: Subject to any disclaimer, the term of this patent is extended or adjusted under 35 U.S.C. 154(b) by 571 days.

(21) Appl. No.: 09/916,318

(22) Filed: Jul. 30, 2001

(65) Prior Publication Data
US 2002/0025778 A1 Feb. 28, 2002

(30) Foreign Application Priority Data
Aug. 28, 2000 (KR) ................ 2000-49987

(51) Int. Cl.
*H04Q 7/20* (2006.01)
(52) U.S. Cl. .......... 455/422.1; 455/3.01; 455/465; 455/426.2
(58) Field of Classification Search ...... 455/426.1, 455/426.2, 461, 446, 422.1, 562.1, 509, 561, 455/41.2, 3.05, 3.01, 434, 82, 84, 86, 85, 455/3.04, 462, 465, 11.1, 554.2, 555, 454; 370/328, 334, 338, 465, 352, 348, 401, 349
See application file for complete search history.

(56) References Cited

U.S. PATENT DOCUMENTS

| | | | | |
|---|---|---|---|---|
| 5,410,738 A | * | 4/1995 | Diepstraten et al. | 455/528 |
| 6,014,546 A | * | 1/2000 | Georges et al. | 725/79 |
| 6,304,560 B1 | * | 10/2001 | Archambaud et al. | 370/324 |
| 6,351,456 B1 | * | 2/2002 | Struhsaker et al. | 370/280 |
| 6,393,280 B1 | * | 5/2002 | Lee et al. | 455/426.2 |
| 6,434,187 B1 | * | 8/2002 | Beard et al. | 455/86 |
| 6,512,916 B1 | * | 1/2003 | Forbes, Jr. | 455/3.01 |
| 6,560,652 B1 | * | 5/2003 | Larson et al. | 709/232 |
| 6,640,100 B1 | * | 10/2003 | Kojima et al. | 455/426.2 |
| 6,654,616 B1 | * | 11/2003 | Pope et al. | 455/445 |
| 6,681,100 B1 | * | 1/2004 | Ge | 455/78 |
| 6,741,857 B1 | * | 5/2004 | Warden et al. | 455/423 |

* cited by examiner

*Primary Examiner*—Edward F. Urban
*Assistant Examiner*—John J. Lee
(74) *Attorney, Agent, or Firm*—Fleshner & Kim, LLP (57) ABSTRACT

Disclosed is a integrated wireless local loop (WLL) and wireless local area network (WLAN) transceiver apparatus which connects a wireless local loop (WLL) base station and a plurality of wireless local area network (WLAN) terminals, including a WLL transceiver in communication with a WLL base station, a WLAN transceiver in communication with a plurality of WLAN terminals, and a specialized processing device which translates communications between WLL signaling protocol and WLAN signaling protocol. The apparatus allows a plurality of wireless terminals to simultaneously access the Internet without using a dedicated line or a cable line.

32 Claims, 4 Drawing Sheets

INTEGRATED WIRELESS LOCAL LOOP (WLL) AND WIRELESS LOCAL AREA NETWORK (WLAN) TRANSCEIVER APPARATUS

BACKGROUND OF THE INVENTION

1. Field of the Invention

The present invention relates to a wireless network access system, and more particularly, a WLL-WLAN integrated network system which allows Internet access and constructs a network wirelessly by combining a wireless LAN and a wireless local loop (WLL) employing a wideband code division multiple access (W-CDMA) scheme.

2. Background of the Related Art

Currently, a W-CDMA system called a third-generation partner projection (3GPP) or a third-generation (3G) mobile wireless technology requires access to a core network such as PSTN, ISDN, IMT-2000, PSDN, the Internet, WAN/LAN, etc., through its own network for a wireless (radio) telecommunication.

A wireless telecommunication network system is largely classified into a mobile communication network and a wireless local loop (WLL) according to an application field. The mobile communication network can support data communication at transmission rates of up to about 384 Kbps during movement of a mobile and portable wireless device and up to about 2 Mbps during a stop thereof, and the wireless local loop (WLL) can support a data communication at a transmission rate of up to about 2 Mbps.

Also, the wireless local area network (WLAN) specified by a standard, IEEE 802.11b can support data communication at up to 11 Mbps, but requires a connection to an Ethernet switch using a cable line for the data communication.

Figure 1:
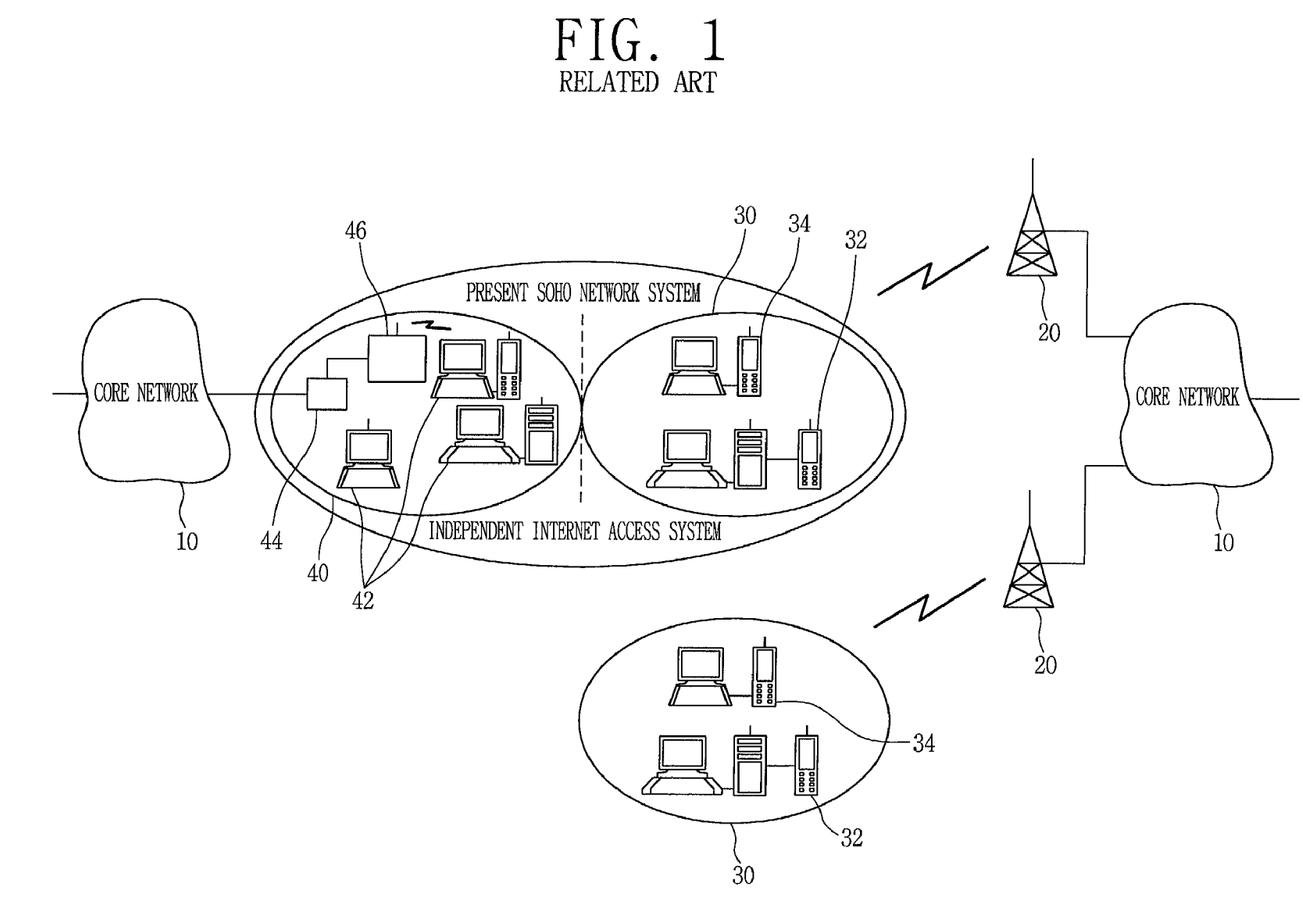
FIG. 1 is a broad block diagram illustrating the construction of an Internet access system independently employing a wireless local loop (WLL) and a wireless local area network (WLAN) according to the related art.

FIG. 1 is a broad block diagram illustrating the construction of an Internet access system independently employing a wireless local loop (WLL) and a wireless local area network (WLAN) according to the related art.

As shown in FIG. 1, a general Internet access system 30 of a wireless local loop (WLL) includes a WLL base station 20 connected to the core network (hereinafter, referred to as "Internet") 10 and a plurality of WLL terminals (32 and 34) connected to the WLL base station 20 wirelessly. The WLL terminals (32 and 34) include a mobile WLL terminal 34 connected to a lap top computer and a fixed WLL terminal 32 connected to a desk top computer.

Basically, the WLL is not much different from a cellular communication system or a personal communication system in the aspect that a base station and a terminal transmit and receive a data to each other wirelessly. It is a telecommunication network constructed using a radio system instead of a wired line which connects the core network and a terminal of a network subscriber. This technique was first developed by the Bell Atlantic Network Services, Inc. (Arlington, Va.) of the United States in the early 1970's as a method for cutting down on a facility expense in constructing a telecommunication network in a sparsely populated area such as a farming area or a remote mountain village. Currently, however, with the advanced radio technology and as the WLL draws more attention, its utilization coverage and installation area are being widened. Thanks to its advantages of a low unit cost per line and easy installation compared with a wired line, it is in increasing demand.

Figure 2:
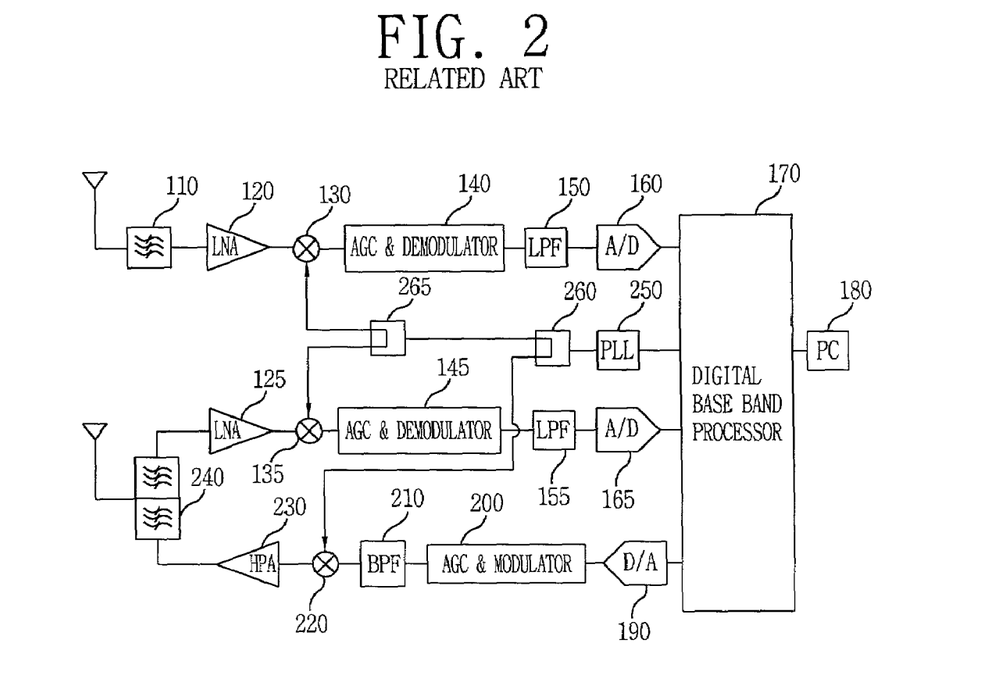
FIG. 2 is a block diagram of a radio transceiver of a WLL terminal according to the related art.

FIG. 2 is a block diagram of a radio transceiver of a WLL terminal according to the related art. As shown in FIG. 2, the radio transceivers of the WLL terminals 32 and 34 employ a diversity antenna, respectively and a radio-frequency, electromagnetic signal received by each diversity antenna is converted into an electrical signal which is supplied to a band pass filter (BPF)110 and a duplexer 240 which apply only a necessary frequency band of the electrical signal to low noise amplifiers (LNAs) 120 and 125, respectively, to amplify the necessary frequency band. The amplified signals generated from the low noise amplifiers (LNAs) 120 and 125 are applied to down mixers 130 and 135 which down-convert in frequency the amplified signals to form intermediate frequency signals, respectively. Then, the down-converted signals generated from the down mixers 130 and 135 are applied to automatic gain controller (AGC) and demodulators 140 and 145 which amplify the down-converted signals to a proper level and demodulate the amplified signals. The signals generated from the automatic gain controller (AGC) and demodulators 140 and 145 are applied to low pass filters (LPFs) 150 and 155 which reject noise components of the signals applied thereto from the automatic gain controller (AGC) and demodulators 140 and 145 for application to A/D converters 160 and 165. The A/D converters 160 and 165 convert the noise-rejected signals into digital signals for application to a digital baseband processor 170 which, in turn, applies the converted digital signal to a personal computer (PC) 180 so that a user can receive data on the Internet 10.

In the meantime, the data transmitted from the personal computer (PC) 180 is transmitted to the digital baseband processor 170, and then a D/A converter 190 which converts the data transmitted thereto into an analog signal for application to an automatic gain controller (AGC) and modulator 200. The automatic gain controller (AGC) and modulator 200 controls the-gain of the converted analog signal to a proper level and modulates the converted analog signal for application to a band pass filter (BPF) 210 which, in turn, rejects noise components of the signal applied thereto from the automatic gain controller (AGC) and demodulator 200 for application to an up mixer 220. The up mixer 220 up-converts in frequency the signal applied thereto from the band pass filter (BPF) 210 for application to a high power amplifier (HPA) 230. The high power amplifier (HPA) 230 sufficiently amplifies the output of the up-converted signal applied thereto from the up mixer 220 so that it can be sent out by radio for application to the duplexer 240 which, in turn, transmits the amplified signal applied thereto from the high power amplifier (HPA) 230 again to the WLL base station 20. However, in case of such a WLL Internet access system 30, there has been a problem in that a plurality of WLL terminals 32 have difficulties in accessing the Internet simultaneously.

As shown in FIG. 1, a general Internet access system 40 of a wireless local area network (WLAN) includes a HUB 44 connected through wire to the Internet 10, a wireless access point 46 connected through wire to the HUB 44 for enabling a wireless data transmission between the HUB 44 and a plurality of WLAN terminals 42, and the plurality of WLAN terminals 42 included in a mobile or fixed computer for connecting to the wireless access point 46.

A conventional WLAN Internet access system 40 constructed as described above can enable a data communication with the Internet 10 at a transmission rate of up to 11 Mbps by means of the HUB 44 connected to the Internet 10 through a cable line and the wireless access point 46 for driving the plurality of WLAN terminals 42, for example, 10 WLAN terminals.

Figure 3:
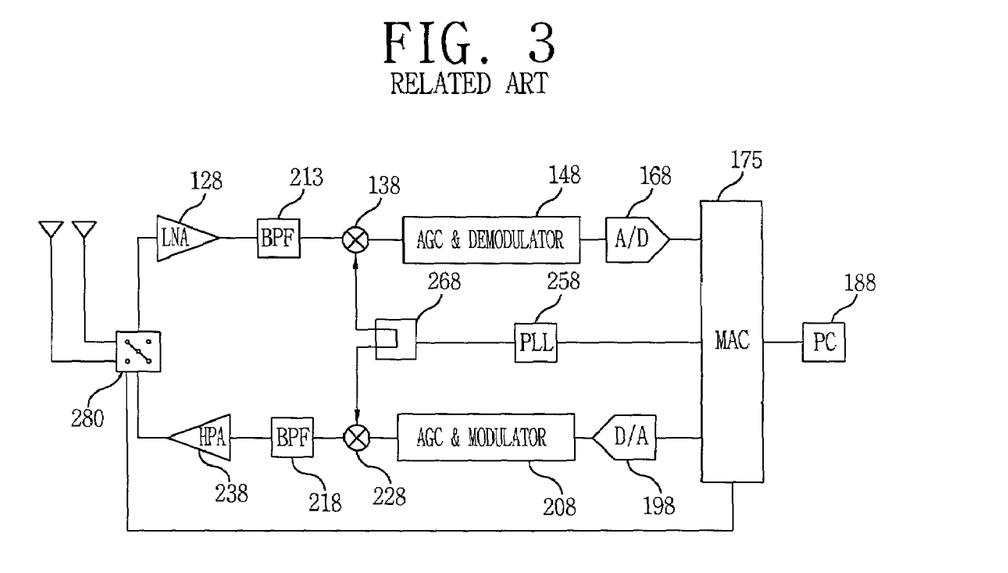
FIG. 3 is a block diagram of a WLAN access point according to the related art.

FIG. 3 is a block diagram of a WLAN access point according to the related art. As shown in FIG. 3, data transmission from the WLAN Internet access system 40 is performed by a half duplex scheme in which a medium access controller (MAC) 175 controls a dual switch 280 to determine whether to transmit or receive a signal.

In the case where the dual switch 280 selects a receiving antenna, a radio-frequency, electromagnetic signal received by the selected receiving antenna is converted into an electrical signal supplied to a low noise amplifier (LNA) 128 through the dual switch 280. The low noise amplifier (LNA) 128 amplifies the electrical signal applied thereto from the selected antenna for application to a band pass filter (BPF) 213 which, in turn, passes only a necessary frequency band of the amplified signal. The filtered signal generated from the band pass filter (BPF) 213 is applied to a down mixer 138 which converts downward in frequency the filtered signal into an intermediate frequency signal. Then, the converted intermediate frequency signal generated from the down mixer 138 is applied to an automatic gain controller (AGC) and demodulator 148 which demodulates the intermediate frequency signal. The demodulated signal generated from the automatic gain controller (AGC) and demodulator 148 is applied to an A/D converter 168 which converts the demodulated signal into a digital signal. The converted digital signal is applied to a computer (PC) 188 through the medium access controller (MAC) 175 so that a user can receive data on the Internet 10.

In the meantime, the signal transmitted from the computer (PC) 188 is processed by the medium access controller (MAC) 175 which applies the processed signal to a D/A converter 198. The D/A converter 198 converts the signal applied thereto from the medium access controller (MAC) 175 into an analog signal for application to an automatic gain controller (AGC) and modulator 208 which modulates the converted analog signal. The modulated analog signal is applied to a up mixer 228 which up-converts in frequency the modulated signal applied thereto from the automatic gain controller (AGC) and modulator 208 for application to a band pass filter (BPF) 218 which, in turn, rejects noise components of the up-converted signal for application to a high power amplifier (HPA) 238. The high power amplifier (HPA) 230 amplifies the signal applied thereto from the band pass filter (BPF) 218 to transmit the amplified . signal to the wireless access point 46 by way of the dual switch 280. At this time, the signal received by the wireless access point 46 is transmitted to the HUB 44, and then the Internet 10 through wire.

However, in case of such a WLAN Internet access system 40, there has been a problem in that the HUB 44 must connect to the Internet 10 through a cable line, and the WLL Internet access system 30 and the WLAN Internet access system 40 have been operated as independent network systems.

The above references are incorporated by reference herein where appropriate for appropriate teachings of additional or alternative details, features and/or technical background. cl SUMMARY OF THE INVENTION An object of the invention is to solve at least the above problems and/or disadvantages and to provide at least the advantages described hereinafter.

Therefore, the present invention has been made in view of the above-mentioned problems, and it is an object of the present invention to provide a plurality of users with a integrated wireless local loop (WLL) and wireless local area network (WLAN) Internet access system which combines a wireless local loop (WLL) and a wireless local area network (WLAN) which have been operated independently of each other at a small-scale office or a home office for small office home office (SOHO).

According to the present invention, there is provided an integrated wireless local loop (WLL) and wireless local area network (WLAN) transceiver apparatus which connects a wireless local loop (WLL) base station and a plurality of wireless local area network (WLAN) terminals, including a WLL transceiver in communication with a WLL base station, a WLAN transceiver in communication with wireless terminals, and a means for translating signals between the WLL signal protocol and the WLAN signal protocol.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
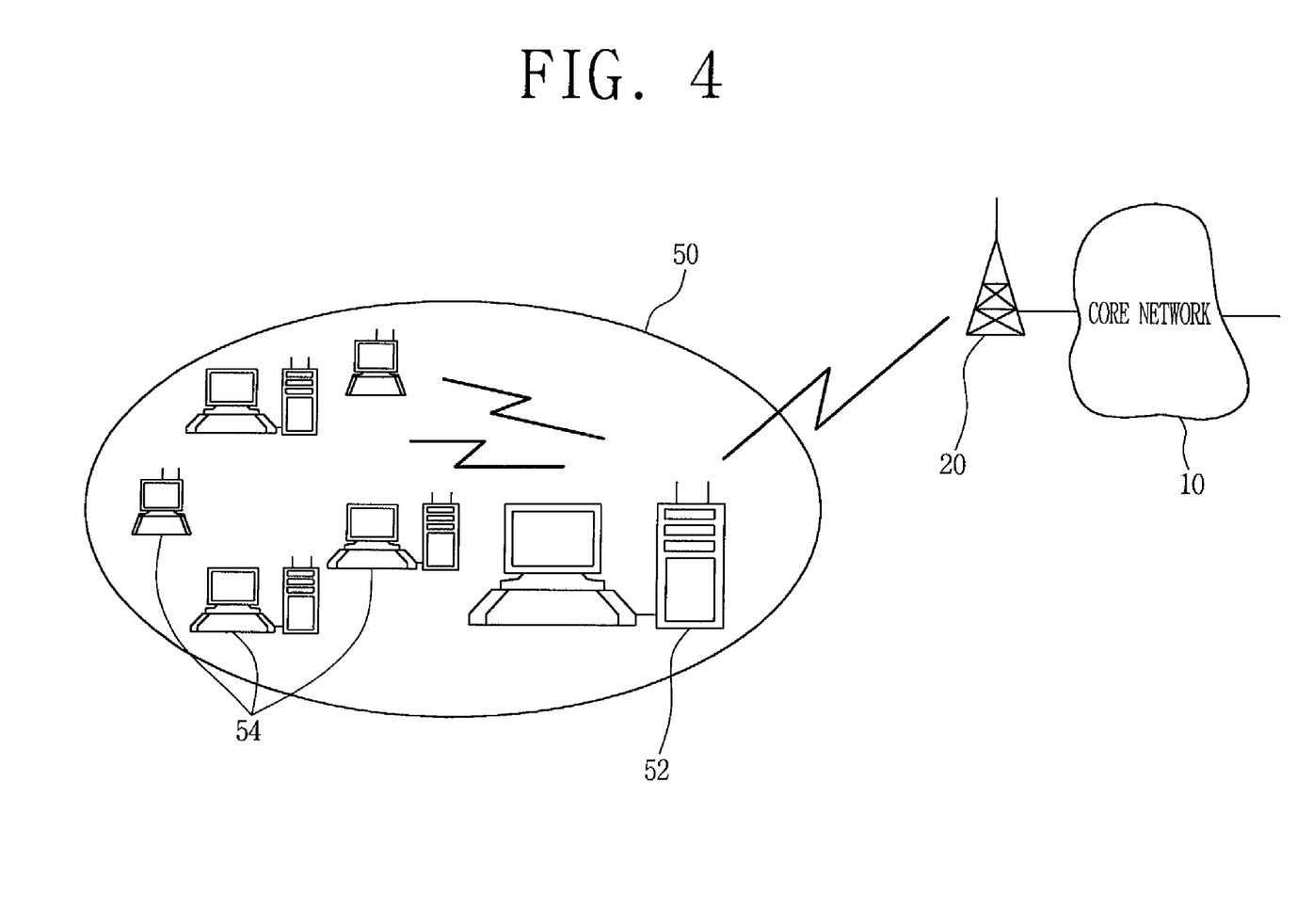
FIG. 4 is a broad block diagram illustrating the construction of an integrated wireless local loop (WLL) and wireless local area network (WLAN) Internet access system according to the present invention.

Reference will now be made in detail to the preferred embodiments of the present invention. FIG. 4 is a broad block diagram illustrating the construction of an integrated wireless local loop (WLL) and wireless local area network (WLAN) Internet access system according to the present invention. As shown in FIG. 4, the integrated wireless local loop (WLL) and wireless local area network (WLAN) Internet access system 50 includes a core network 10, a wireless local loop (WLL) base station 20 connected to the core network 10, a computer 52 hereinafter, referred to as "integration terminal") having an integrated wireless local loop (WLL) and wireless local area network (WLAN) transceiver apparatus, and a plurality of WLAN terminals 54.

The core network 10 includes a public switched telephone network (PSTN), an integrated services digital network (ISDN), an IMT-2000 which is the next-generation mobile telecommunication technology for a high-speed and high-capacity transmission, a public switched data network (PSDN), the Internet, a wide area network (WAN) or a local area network (LAN), etc.

The integrated wireless local loop (WLL) and wireless local area network (WLAN) Internet access system 50 constructed as described above allows a WLL base station 20 connected to the core network (hereinafter, referred to as "the Internet") through a cable line to be connected to the integration terminal 52 through a wireless (radio) connection. Also, the integrated wireless local loop (WLL) and wireless local area network. (WLAN) Internet access system 50 uses the integration terminal 52 as a server to bundle the plurality of WLAN terminals into a wireless LAN. At this time, the integrated wireless local loop (WLL) and wireless local area network (WLAN) transceiver apparatus included in the integration terminal 52, which is an apparatus for coupling two independent wireless networks, i.e., a wireless local loop (WLL) and a wireless local area network (WLAN), allows the plurality of WLAN terminals 54 to connect to the Internet 10 through only a wireless (radio) connection. The plurality of WLAN terminals 54 can use a radio transceiver of a conventional WLAN terminal 42 as it is without any addition or replacement of the apparatus.

Figure 5:
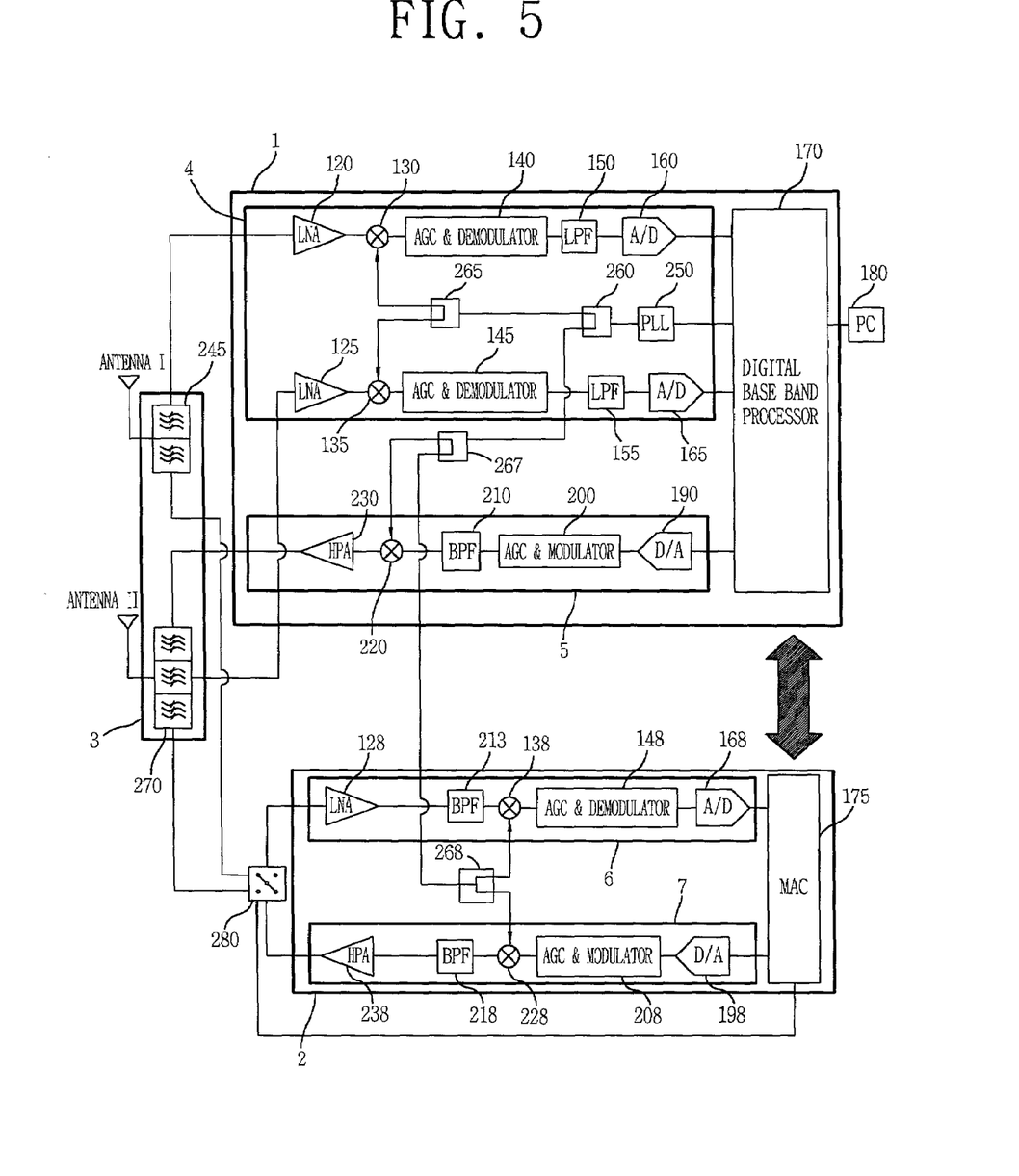
FIG. 5 is a block diagram of the construction of an integrated wireless local loop (WLL) and wireless local area network (WLAN) transceiver apparatus according to the present invention.

FIG. 5 is a block diagram of the construction of an integrated wireless local loop (WLL) and wireless local area network (WLAN) transceiver apparatus according to the present invention. As shown in FIG. 5, the integrated wireless local loop (WLL) and wireless local area. network (WLAN) transceiver apparatus, which is a combination of the radio transceiver of the WLL terminal and the wireless access point 46 of the wireless local area network (WLAN) Internet access system 40, includes a WLL transceiver 1, a WLAN transceiver 2, and an antenna unit 3.

The WLL transceiver 1, which is adapted to access the WLL base station 20 by a WLL transmission scheme to transmit and receive a radio signal to and from the WLL base station 20, performs the same function as that of a conventional radio transceiver of the WLL terminal. The WLL transceiver 1 includes a WLL reception processor 4 adapted to receive the radio signal from the WLL base station 20 and allow the received radio signal to undergo a predetermined reception process for application to a digital baseband processor 170, a WLL transmission processor 5 adapted to receive a signal from the digital baseband processor 170 and allow the received signal to undergo a predetermined transmission process for radio transmission to the WLL base station 20, and the digital baseband processor 170 adapted to perform a digital signal process (DSP) for the signal applied thereto from the WLL reception processor 4 or the signal applied to the WLL transmission processor 5 therefrom.

The WLAN transceiver 2, which is adapted to access the plurality of WLAN terminals 54 by a WLAN transmission scheme to transmit and receive a radio signal to and from the WLL base station 20, performs the same function as that of a conventional wireless access point 46 of the WLAN Internet access system.40 of FIG. 1. The WLAN transceiver 2 includes a WLAN reception processor 6 adapted to receive the radio signal from the plurality of WLAN terminals 54 and allow the received radio signal to undergo a predetermined reception process for application to a medium access controller (MAC) 175, a WLAN transmission processor 7 adapted to receive a signal from the medium access controller (MAC) 175 and allow the received signal to undergo a predetermined transmission process for radio transmission to the plurality of WLAN terminals 54, and the medium access controller (MAC) 175 adapted to supply the signal applied thereto from the digital baseband processor 170 to the WLAN transmission processor 7 or supply the signal applied thereto from the WLAN reception processor 6 to the digital baseband processor 170, and perform an access control function to normally carry out the supply of the signal.

The antenna unit 3 includes a duplexer 245 adapted to apply a radio signal received by a first antenna to the WLL reception processor 4 or the WLAN reception processor 6, and a triplexer 170 adapted to apply a radio signal received by a second antenna to the WLL reception processor 4 or apply a signal supplied thereto from the WLL transmission processor 5 or the WLAN transmission processor 7 to the second antenna.

The integrated wireless local loop (WLL) and wireless local area network (WLAN) transceiver apparatus employs a diversity antenna for collecting the radio signal by two antennas in order to prevent a fading phenomenon of a signal received through multiple paths. The two antennas of diversity antenna are spaced apart from each other to maintain an optimum distance between them in consideration of a wavelength. Generally, in case of using two antennas, the first antenna is used as a receive-only antenna and the second antenna is used as a combined transmit/receive antenna.

FIG. 5 is a block diagram of the construction of an integrated wireless local loop (WLL) and wireless local area network (WLAN) transceiver apparatus according to the present invention. An operation of corresponding circuits and elements of the WLL and WLAN transceiver apparatus of the present invention when a certain radio signal is transmitted to the plurality of WLAN terminals 54 from the WLL base station 20 will now be described in detail hereinafter with reference to FIG. 5.

The radio signal transmitted to the plurality of WLAN terminals 54 from the WLL base station 20 is collected by the first and second antennas, respectively. The two identical radio signals each collected by the first and second antennas are applied to the WLL reception processor 4 through the duplexer 245 and the triplexer 270.

The two radio signals applied to the WLL reception processor 4 are supplied to low noise amplifiers (LNAs) 120 and 125, respectively, which amplify the two radio signals. The amplified two signals generated from the low noise amplifiers (LNAs) 120 and 125 are applied to down mixers 130 and 135 which down-convert in frequency the amplified two signals to form intermediate frequency signals, respectively. Then, the down-converted signals generated from the down mixers 130 and 135 are applied to automatic gain controller (AGC) and demodulators 140 and 145, respectively, which amplify the down-converted signals to a proper level and demodulate the amplified signals. The signals generated from the automatic gain controller (AGC) and demodulators 140 and 145 are applied to low pass filters (LPFs) 150 and 155, respectively, which reject noise components of the signals applied thereto from the automatic gain controller (AGC) and demodulators 140 and 145 for application to A/D converters 160 and 165. The A/D converters 160 and 165 convert the noise-rejected signals into digital signals for application to a digital baseband processor 170. The digital baseband processor 170 detects a signal having an error in the less amount of the two signals applied thereto from the A/D converters 160 and 165, thereby improving a reliability of the received signals.

The frequency supplied to the down mixers 130 and 135 is produced by a phase locked loop (PLL) 250 and is divided by 2 by a first distributor 260 which, in turn, outputs the divided two frequencies. One of the two frequencies is applied to a third distributor 267 and the other of them is applied to a second distributor 265. The second distributor 265 divides the frequency applied thereto from the first distributor 260 by 2 to apply the divided two frequencies to the down mixers 130 and 135, respectively. The phase locked loop (PLL) 250 is controlled by the digital baseband processor 170.

The digital signals processed by the digital baseband processor 170 are applied to the computer (PC) 180 or the medium access controller (MAC) 175 so that a user can receive or download data from the Internet.

In the meantime, the medium access controller (MAC) 175 processes the signal thereto from the digital baseband processor 170 for application to the WLAN transmission processor 7. The signal applied to the WLAN transmission processor 7 is converted into an analog signal by a D/A converter 198 which applies the converted analog signal to an automatic gain controller (AGC) and modulator 208. The automatic gain controller (AGC) and modulator 208 controls a gain of the converted analog signal to a proper level and modulates the converted analog signal for application to a up mixer 228 which up-converts in frequency the modulated signal applied thereto from the automatic gain controller (AGC) and modulator 208 into a high frequency signal conforming to a WLAN transmission scheme for application to a band pass filter (BPF) 218. The band pass filter (BPF) 218 rejects noise components of the up-converted signal applied thereto from the up mixer 228 for application to a high power amplifier (HPA) 238. The high power amplifier (HPA) 238 sufficiently amplifies a power of the noise-rejected signal applied thereto from the band pass filter (BPF) 218 so that it can be sent out by radio for application to the triplexer 270 through the dual switch 280. The triplexer 270 transmits the amplified signal applied thereto from the high power amplifier (HPA) 238 to a corresponding WLAN terminal 54.

The frequency supplied to the up mixer 228 is produced by a phase locked loop (PLL) 250 and is divided by 2 by a first distributor 260 which, in turn, outputs the divided two frequencies. One of the two frequencies is applied to a third distributor 267 and the other of them is applied to a second distributor 265. The third distributor 267 divides the frequency applied thereto from the first distributor 260 by 2 to apply one of the divided two frequencies to the down mixer 220 and the other of them to a fourth distributor 268 respectively. The divided frequency applied to the fourth distributor 268 is again divided by 2, and one of the two frequencies divided by the fourth distributor 268 is applied to the up mixer 228.

The operation of corresponding circuits and elements of the WLL and WLAN transceiver apparatus of the present invention when a certain radio signal is transmitted to the WLL base station 20 from the plurality of WLAN terminals 54 will now be described in detail hereinafter with reference to FIG. 5.

The radio signal transmitted from the WLAN terminal 54 in the same scheme as a conventional WLAN transmission scheme is collected by the first antenna of the duplexer 245 and is applied to the WLAN reception processor 6 through the dual switch 280.

The radio signal applied to the WLAN reception processor 6 is amplified by a low noise amplifier (LNA) 128. The low noise amplifier (LNA) 128 applies the amplified signal to a band pass filter (BPF) 213 which, in turn, rejects noise components of the amplified signal. The filtered signal generated from the band pass filter (BPF) 213 is applied to a down mixer 138 which converts downward in frequency the filtered signal into an intermediate frequency signal. Then, the frequency supplied to the down mixer 138 is produced by the fourth distributor 268. The converted intermediate frequency signal generated from the down mixer 138 is applied to an automatic gain controller (AGC) and demodulator 148 which amplifies the converted intermediate frequency signal to a proper level and demodulates the amplified signal. The demodulated signal generated from the automatic gain controller (AGC) and demodulator 148 is applied to an A/D converter 168 which converts the demodulated signal into a digital signal. The converted digital signal is applied to the medium access controller (MAC) 175 which processes the digital signal for application to the digital baseband processor 170. The digital baseband processor 170 performs a digital signal process (DSP) for the processed signal applied thereto from the medium access controller (MAC) 175 to conform to a WLL transmission scheme for application to the WLL transmission processor 5.

The signal applied to the WLL transmission processor 5 from the digital baseband processor 170 is converted in to an analog signal by a D/A converter 190 for application to the automatic gain controller (AGC) and modulator 200. The automatic gain controller (AGC) and modulator 200 controls a gain of the converted analog signal to a proper level and modulates the converted analog signal for application to a band pass filter (BPF) 210 which, in turn, rejects noise components of the signal applied thereto from the automatic gain controller (AGC) and demodulator 200 for application to the up mixer 220. The up mixer 220 up-converts in frequency the noise-rejected signal applied thereto from the band pass filter (BPF) 210 into a high frequency signal to conform to the WLL transmission scheme for application to the high power amplifier (HPA) 230. The high power amplifier (HPA) 230 sufficiently amplifies a power of the up-converted signal applied thereto from the up mixer 220 so that it can be sent out by radio for application to the triplexer 270 which, in turn, transmits the amplified signal applied thereto from the high power amplifier (HPA) 230 again to the WLL base station 20.

The frequency supplied to the up mixer 220 is applied from the third distributor 267. The integrated WLL and WLAN transceiver apparatus allows five mixers to share the phase locked loop (PLL) 250 using a plurality of distributors.

As can be seen from the foregoing, the integrated WLL and WLAN transceiver apparatus of the present invention allows the integration terminal 52 having the integrated WLL and WLAN transceiver apparatus included therein to access the Internet 10 by way of the WLL base station 20, so that it enables a data communication with the Internet 10 each other intrinsically and enables a data communication between the plurality of WLAN terminals 54 connected to the integration terminal 52 and the Internet 10 without any wired connection. Moreover, since the integrated WLL and WLAN transceiver apparatus shares such components as the first and second antennas, the phase locked loop (PLL) 250, etc., overlapped components can be saved, so that the cost price is expected to be reduced.

The integrated WLL and WLAN transceiver apparatus has an effect of efficiently utilizing limited wireless communication resources in that it enables a configuration of the combined WLL and WLAN Internet access system without any great modification to a conventional Internet access system independently employing WLL and WLAN, and allows a plurality of terminals to simultaneously access the Internet without using a dedicated line or a cable line requiring a payment of an expensive rental fee.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An integrated wireless local loop (WLL) and wireless local area network (WLAN) transceiver apparatus which connects a wireless local loop (WLL) base station and a plurality of wireless local area network (WLAN) terminals, comprising:
   a WLL transceiver section adapted to connect to the WLL base station to transmit and receive a radio signal to and from the WLL base station;
   a WLAN transceiver section adapted to connect to the plurality of WLAN terminals to transmit and receive a radio signal to and from the plurality of WLAN terminals; and
   an antenna unit including a first antenna for receiving the radio signal from the WLL base station and the first antenna for receiving the radio signal from one of the WLAN terminals, and the antenna unit applying the received radio signal to the WLL transceiver section or the WLAN transceiver section.

2. The integrated WLL and WLAN transceiver apparatus according to claim 1, wherein the WLL transceiver section comprises:
   a WLL reception processing section adapted to receive the radio signal from the WLL base station and perform a predetermined reception process for the received radio signal for use in the integrated WLL and WLAN transceiver apparatus;
   a WLL transmission processing section adapted to perform a predetermined transmission process for the radio signal to be transmitted to the WLL base station; and
   a digital baseband processor adapted to perform a digital signal process (DSP) for the radio signal applied thereto from the WLL reception processing section or the radio signal applied to the WLL transmission processing section therefrom.

3. The integrated WLL and WLAN transceiver apparatus according to claim 1, wherein the WLAN transceiver section comprises:
   a WLAN reception processing section adapted to receive the radio signal from the plurality of WLAN terminals and perform a predetermined reception process for the received radio signal for application to a digital baseband processor of the WLL transceiver section;
   a WLAN transmission processing section adapted to receive a signal from the digital baseband processor and perform a predetermined transmission process for the received signal for radio transmission to the plurality of WLAN terminals; and
   a medium access controller (MAC) adapted to supply the signal applied thereto from the digital baseband processor to the WLAN transmission processing section or supply the signal applied thereto from the WLAN reception processing section to the digital baseband processor of the WLL transceiver section.

4. The integrated WLL and WLAN transceiver apparatus according to claim 3, wherein the plurality of WLAN terminals uses a WLAN radio transmitter included in the plurality of WLAN terminals.

5. The integrated WLL and WLAN transceiver apparatus according to claim 1, wherein the antenna unit comprises:
   a duplexer adapted to apply a radio signal received by the first antenna to the WLL reception processing section or the WLAN reception processing section; and
   a triplexer adapted to apply a radio signal received by a second antenna to the WLL reception processing section or apply a signal supplied thereto from the WLL transmission processing section or the WLAN transmission processing section to the second antenna.

6. The integrated WLL and WLAN transceiver apparatus according to claim 5, wherein the duplexer is connected to the first antenna used as a receive-only antenna.

7. The integrated WLL and WLAN transceiver apparatus according to claim 1, wherein the WLL transceiver section and the WLAN transceiver section share one phase locked loop (PLL) using a plurality of distributors.

8. The integrated WLL and WLAN transceiver apparatus according to claim 1, wherein the integrated WLL and WLAN transceiver apparatus is included in a specific computer, and allows the specific computer to function as a server of the plurality of WLAN terminals.

9. The integrated WLL and WLAN transceiver apparatus according to claim 1, wherein the integrated WLL and WLAN transceiver apparatus includes a duplexer and a triplexer in order to distribute and apply the signals collected by the antenna unit to each of the WLL and WLAN transceiver sections.

10. The integrated WLL and WLAN transceiver apparatus according to claim 1, wherein the antenna unit uses a space diversity antenna for preventing a fading phenomenon of a signal received through a multipath so that the first antenna and a second antenna of the diversity antenna are spaced apart from each other.

11. The integrated WLL and WLAN transceiver apparatus according to claim 10, wherein the space diversity antenna is shared by the WLL transceiver section and the WLAN transceiver section.

12. The integrated WLL and WLAN transceiver apparatus according to claim 1, wherein the antenna unit applies received signals to a WLL reception processing section of the WLL transceiver section.

13. The integrated WLL and WLAN transceiver apparatus according to claim 1, wherein the antenna unit applies received signals to a WLAN reception processing section of the WLAN transceiver section.

14. A WLL-WLAN integrated transmitting and receiving method comprising:
   transmitting a data from a WLL base station and transmitting it to a WLL receiving processor;
   transmitting the data which has been subjected to a predetermined procedure in the WLL receiving processor through a digital baseband processor and a medium access controller (MAC) to a WLAN transmitting processor, wherein the WLL receiving processor and the WLAN transmitting processor share a phase locked loop; and
   transmitting the data which has been subjected to a predetermined procedure in the WLAN transmitting processor to the WLAN terminal, wherein the data transmitted from the WLL base station is received through a first antenna and a second antenna, and the signal of the first antenna is transmitted through a duplex to the WLL receiving processor and the signal of the second antenna is transmitted through a triplexer to the WLL receiving processor.

15. The method of claim 14, wherein the WLL receiving processor and the WLAN transmitting processor share the phase locked loop by using a plurality of distributors.

16. A WLL-WLAN integrated transmitting and receiving method comprising:
  transmitting a data from a WLAN terminal and transmitting it to a WLAN receiving processor;
  transmitting the data which has been subjected to a predetermined procedure in the WLAN receiving processor through a medium access controller (MAC) and a digital baseband processor to a WLL transmitting processor, wherein the WLL transmitting processor and the WLAN receiving processor share a phase locked loop; and
  transmitting the data which has been subjected to a predetermined procedure in the WLL transmitting processor to the WLL base station,
  wherein the WLL transmitting processor and the WLAN receiving processor share the phase locked loop by using a plurality of splitters.

17. The method of claim 16, wherein the data signal transmitted from the WLAN terminal is received through a first antenna and then is transmitted through a duplex to the WLAN receiving processor.

18. An apparatus comprising:
  a WLL transceiver for communicating with a wireless base station;
  a WLAN transceiver for communicating with one or more devices in a network;
  an antenna unit having a first antenna coupled to the WLL transceiver and to the WLAN transceiver, the first antenna to receive a radio signal from the wireless base station and the first antenna to receive a radio signal from the one or more devices, and the antenna unit applying the received radio signal to the WLL transceiver or the WLAN transceiver; and
  a memory storing data and instructions to enable the processing of data to conform to a WLL signaling scheme and to enable the processing of data to conform to a WLAN signaling scheme.

19. The apparatus of claim 18, wherein the WLL transceiver and the WLAN transceiver share a single phase locked loop and a plurality of distributors.

20. The apparatus of claim 18, wherein the antenna unit includes a space diversity pair of antennas to reduce multipath fading and noise.

21. The apparatus of claim 18, wherein the WLL transceiver comprises:
  a transmitting channel coupled to the first antenna of the antenna unit; and
  a dual input receiving channel coupled to a second antenna.

22. The apparatus of claim 21, further comprising a duplexer in the antenna unit, allowing the first antenna to serve as both the transmitting channel and as the receiving channel, according to the state of the duplexer.

23. The apparatus of claim 21, wherein the WLL transceiver further comprises one or more of the elements from the group of AGC's, modulators, mixers, filters, D/A converters and power amplifiers.

24. The apparatus of claim 21, wherein the WLL transceiver further comprises one or more of the elements from the group of low noise amplifiers, AGC's, demodulators, mixers, filters, and A/D converters.

25. The apparatus of claim 21, further comprising a digital baseband processor, which processes data such that the data conforms to a WLL signaling scheme.

26. The apparatus of claim 18, wherein the antenna unit comprises two antennas with a duplexer and a triplexer to provide the appropriate connections to the receiving channels and transmitting channels of the apparatus.

27. The apparatus of claim 18, wherein the WLAN transceiver comprises one or more of the elements from the group of AGC's, modulators, mixers, filters, D/A converters and power amplifiers.

28. The apparatus of claim 18, wherein the WLAN transceiver further comprises one or more of the elements from the group of low noise amplifiers, AGC's, demodulators, mixers, filters, and D/A converters.

29. The apparatus of claim 18, further comprising a medium access controller, which applies digital signal processing techniques to data such that the data conforms to the WLAN signaling scheme.

30. The apparatus of claim 29, wherein the medium access controller is further equipped to process the digital data for transfer to or from the WLL transceiver.

31. The apparatus of claim 18, wherein the antenna unit applies received signals to the WLL transceiver and to the WLAN transceiver.

32. A system for providing a core network access via a wireless local area network, the system comprising:
  a WLL base station connected to the core network;
  a plurality of devices connected in a wireless LAN (WLAN); and
  a single integrated apparatus for transferring data from the WLL base station to or from the plurality of devices connected to the WLAN, said single integrated apparatus including means for translating the data between a WLAN signaling protocol and a WLL signaling protocol, the means for translating the data further comprising:
    a WLL transceiver for communicating with the WLL base station;
    a WLAN transceiver for communicating with the plurality of devices in the WLAN;
    an antenna unit having a first antenna coupled to the WLL transceiver and to the WLAN transceiver, the first antenna to receive a radio signal from the WLL base station and the first antenna to receive a radio signal from the plurality of devices, and the antenna unit applying the received radio signal to the WLL transceiver or the WLAN transceiver.

* * * * *